_United States Patent Office_ 2,964,559
Patented Dec. 13, 1960

2,964,559

PROCESS FOR RECOVERY OF OXIDATION CATALYSTS

Donald E. Burney, Whiting, Ind., and Hsiang P. Liao, Park Forest, Ill., assignors to Standard Oil Company, Chicago, Ill., a corporation of Indiana No Drawing. Filed Nov. 12, 1957, Ser. No. 695,549

5 Claims. (Cl. 260—525)

This invention relates to aromatic carboxylic acids and more particularly is concerned with the improved recovery and recycle of oxidation catalysts employed for the liquid phase oxidation with molecular oxygen of aliphatic substituted aromatic compounds to aromatic carboxylic acids.

Aromatic carboxylic acids or "aromatic acids" may be prepared by the liquid phase oxidation of aliphatic-substituted aromatic compounds with molecular oxygen in the presence of a heavy metal oxidation catalyst which, for high aromatic acid yields is very advantageously promoted by the presence of bromine or a bromide ion. By the oxidation, the aliphatic substituent on an aromatic ring is converted to a nuclearly-attached COOH group. The oxidation is advantageously conducted in the presence of an inert liquid medium which functions as a mutual solvent for the catalyst and for the aromatic compounds and which affords intimate and homogeneous contact between the two. While a wide variety of liquid media inert to the oxidation are known, particularly high aromatic acid yields are achieved with water or a lower saturated monocarboxylic acid (i.e., a paraffinic or naphthenic monocarboxylic acid containing from 2 to about 8 carbon atoms per molecule, such as acetic acid). Such diverse liquids as benzophenone, benzonitrile, isooctyl alcohol, mineral oil, and chlorinated aromatics are also suitable media but are somewhat less desirable from the standpoint of yields.

After an oxidation has been completed the reaction mixture must be treated to separate and recover the aromatic acid or acids product, to recover the heavy metal oxidation catalyst, and perhaps to recover the inert medium in a form suitable for recycle. The various procedures which have been proposed for effecting these separations necessarily depend upon the particular aromatic acid or acids involved. For the removal of aromatic acids which are comparatively insoluble or only slightly soluble in the reaction mixture (notably terephthalic and isophthalic acids) the mixture may be filtered, decanted or centrifuged or the like to recover the product as a crystalline solid. And for aromatic acids which are soluble in the reaction mixture but are comparatively volatile (for example, benzoic acid and phthalic acid anhydride), these may be separated from a reaction mixture by a first distillation to remove the reaction medium, and re-distillation at low pressure to recover the volatile aromatic acids from the first distillation bottoms. Where a reaction mixture contains a plurality of aromatic acids, the mixture may be processed by a combination of one or more filtrations and/or distillations.

When either a total reaction mixture or a filtered reaction mixture is to be resolved by distilling off the inert reaction medium (and perhaps re-distilling the first distillation bottoms to separate volatile aromatic acids) there remains a distillation bottoms fraction containing the oxidation catalyst and anywhere from a trace to as much as 80% by weight of aromatic acids together with substantial amounts of a tar-like oxidation by-product. This tar-like by-product may have a consistency varying from that of a heavy oil up to a firm solid coke. Because such oxidation catalysts as cerium, neodymium, vanadium, cobalt, and manganese are rather expensive materials, it is desirable to recover and recycle the catalyst and it may also be desirable to recover at least a portion of the aromatic acid content. Heretofore there have been no completely satisfactory methods for recovering these materials without simultaneously returning a substantial portion of the tar-like oxidation by-products to the oxidation process. Unfortunately, these by-products act as inhibitors for the oxidation reaction, particularly when the oxidation is conducted in the presence of bromine. Accordingly, it is an object of the present invention to provide an improved method for recovering heavy metal oxidation catalysts from a distillation bottoms, which method does not recycle significant amounts, i.e. less than about 25%, of the tar-like oxidation by-products, yet also permits the recovery of a portion of the aromatic acids.

According to the present invention, the bottoms fraction remaining after distilling a reaction mixture or a filtered reaction mixture to remove at least the inert solvent is treated for recovering and recycling the oxidation catalyst contained therein by extracting the heavy metal catalyst with water or a lower saturated monocarboxylic acid, optionally separating the catalyst from the extract, and recycling the catalyst to the oxidation process. The bottoms fraction so treated may for example be the total solids in a reaction mixture after evaporation or distillation to remove the inert solvent, it may be the bottoms from a distilled reaction mixture after prior filtration to remove insoluble aromatic acids, or it may be the distillation bottoms fraction remaining after re-distilling a first distillation bottoms to remove volatile aromatic acids.

It will be noted that the solvents we employ are those which are eminently suitable as inert liquid media for the catalytic oxidation reaction itself. Consequently, the extract may be conducted directly to an oxidation reactor without further purification. Furthermore, along with extracting the catalyst from a distillation bottoms the solvent also recovers a portion of the aromatic acid content which may either be recycled to the oxidation process or separated from the extract. Our process may also be employed where reaction media other than water or saturated acids are used.

Oxidation catalysts which may be recovered from a distillation bottoms according to our process are cations of one or more of the heavy metals of the "Periodic Chart of Elements" at pages 56 and 57 of the "Handbook of Chemistry," 8th edition, Handbook Publishers Inc., Sandusky, Ohio, 1952. Most suitable of the heavy metal catalysts are those having atomic numbers between 23 and 28 inclusive, viz. vanadium, chromium, manganese, iron, cobalt, and nickel. Particularly excellent catalysts are manganese, cobalt, nickel, chromium, vanadium, molybdenum, tungsten, tin, neodymium and cerium, and synergistic effects may be obtained with mixtures of some catalytic metals such as manganese-cobalt, etc. More than one catalyst can of course be recovered simultaneously.

Our process is applicable to the recovery of catalysts employed for the liquid phase oxidation of a wide variety of aliphatic substituted aromatic compounds. In general, an aliphatic side chain containing up to about 4 carbon atoms in a methyl, normal, secondary or tertiary configuration is oxidized to a nuclearly-attached carboxylic acid group without shifting its location on the ring. For example, terephthalic (para) acid may be obtained by the oxidation of any para-dialkyl benzene, as p-ethyl toluene, p-cymene, p-diisopropyl benzene, or p-butyl cumene.

Other aliphatic substituted aromatic compounds which may be oxidized to aromatic carboxylic acids, and the products obtained thereby, are: alkyl aromatics as toluene, the xylenes, pseudocumene, durene, mesitylene, hemimellitene, m-diisopropyl benzene, m-cymene, and o-amyl toluene to the corresponding aromatic mono- or poly-carboxylic acid or alkyl-aromatic carboxylic acid; alkenyl aromatics as styrene to benzoic acid, and a vinyl toluene to a phthalic acid; fused-ring aromatics as acenaphthene to naphthalic acid, methyl naphthalene to naphthoic acid, and phenanthrene (the central ring behaving as an aliphatic substituent) to diphenic acid; naturally occurring fused-ring aromatics as coal to mixed aromatic polycarboxylic acids, and wood charcoal to humic acid and mixed aromatic polycarboxylic acids; diphenyl-type compounds as ditolylethane to isophthalic and terephthalic acids; aromatics containing oxygenated substituents as toluic acids to phthalic acids, acetophenone to benzoic acid, and cumic acid, hydroxycumic acid, $\alpha$-$\alpha'$-dihydroxy-diisopropyl benzene, p-diacetyl benzene, and p-tolualdehyde to terephthalic acid; substitued alkyl-aromatics as p-toluene sulfonic acid to p-sulfobenzoic acid, p-nitrotoluene to p-nitrobenzoic acid, p-tolunitrile to terephthalic acid, chloro-p-xylene to chloroterephthalic acid, and p-chlortoluene to p-chlorbenzoic acid.

By the proper choice of feedstock and the selection of desirably mild or severe operating conditions, almost any aromatic monocarboxylic or polycarboxylic or substituted aromatic mono or polycarboxylic acid may be produced. In all of these processes a similar problem of catalyst recovery from a distillation bottoms is present and may be solved by resorting to the extraction procedure of this invention.

The choice between using water or a lower saturated monocarboxylic acid as an extractive solvent to remove oxidation catalysts depends upon economic and operational considerations. With water the quantity of harmful tar-like oxidation by-products simultaneously extracted with the catalyst is less than that obtained with saturated acids and this quantity may be reduced even further by adding a small amount of strong acid (preferably hydrobromic acid) to the extract to condense and precipitate any dissolved oxidation by-products. On the other hand, with saturated acid solvents there is a superior catalyst recovery, about ⅓ less solvent is needed, somewhat higher extraction temperatures may be employed without the necessity of providing pressure-containing equipment, a larger percentage of aromatic acids contained in the distillation bottoms may be recovered, and the extract may be conducted directly to the oxidation reactor without concentrating it by evaporating water. Extraction with a lower saturated monocarboxylic acid however has the disadvantage of dissolving somewhat more of the tar-like oxidation by-products than does water, and the by-products are not so readily precipitated by the addition of a strong acid. As a general rule, where water is employed as the inert medium for the oxidation reaction it has been found that water extraction of the distillation bottoms is preferred but where a lower saturated monocarboxylic acid is the reaction medium it is economically more attractive to recover the catalyst with the aid of the same material. Mixtures of water with lower saturated monocarboxylic acids are advantageously used in oxidation processes employing the lower saturated monocarboxylic acids as reaction media, since such mixtures are available as the overhead from distillation or evaporation of the reaction mixture. In this event the extract is distilled to separate water from a catalyst-containing saturated acid fraction before recycling the latter to the oxidation process.

The volume of solvent required for effective extraction of a distillation bottoms varies with the solvent employed, the composition and the source of the bottoms, and the extraction temperature. It has been found that between about 3 and 50 volumes of solvent per volume of bottoms and an extraction temperature between about 50 and 150° C. give catalyst recoveries in excess of 90 to 95% of the catalyst present, with larger quantities of solvent and/or higher temperatures leading to better extraction but more solution of the tar-like oxidation by-products. About one third less saturated monocarboxylic acid is required than water for the same extraction efficiency. Where the distillation bottoms contains substantial quantities of soluble aromatic acids, e.g. where a reaction mixture is not vacuum distilled or where vacuum distillation is conducted so as to retain substantial quantities of low-melting phthalic acid anhydride in the bottoms as a flux, it may be economically advisable to increase the quantity of solvent so as to recover at least a portion of the aromatic acids. If however the distillation bottoms is derived from a process wherein the bottoms is substantially denuded of soluble aromatic acids, the quantity of solvent and the extraction temperature need only be sufficient to afford the desired extent of catalyst removal.

It is preferred to conduct the extraction of distillation bottoms while the bottoms are hot molten liquids, which normally occurs at temperatures in excess of about 140° C. Thus, for water and most saturated acids pressure-containing equipment is required. Alternatively, the bottoms may be in the form of pulverized or flaked solids, particularly where the solvent is to be water, and extraction at temperatures in excess of 100° C. is deemed advisable but pressure-containing equipment is unavailable. The extraction time is desirably between about 1 and 20 minutes, with longer times necessary for water than for a saturated monocarboxylic acid. The extraction may be conducted either by slurrying the mixture of distillation bottoms and solvent, by percolating the solvent through a mass of pulverized or molten distillation bottoms or by similar means affording intimate contact between the distillation bottoms and the solvent. At the conclusion of extraction, the raffinate and extract phases are separated by such conventional means as filtration or centrifugation, or by the use of gravity settling tanks or hydrocyclones.

Following the extraction, the catalyst-containing extract may often be conducted directly to the oxidation process. Where the inert solvent for oxidation is the same as the solvent employed for extraction this procedure possesses the advantage of simplicity, and moreover effects the return of aromatic acids dissolved from the distillation bottoms along with the catalyst. Alternatively, the extract may be treated for recovery of these dissolved aromatic acids by such means as cooling the extract to crystallize out the aromatic acids. A third embodiment, desirably employed where the inert oxidation medium is a lower saturated monocarboxylic acid but bottoms extraction is to be conducted using water or a mixture of water and a saturated monocarboxylic acid, is to combine the extract with the inert reaction medium previously distilled from the reaction mixture and concentrate the oxidation catalyst in the lower saturated monocarboxylic acid by fractional distillation to remove water. This fractional distillation may be conducted azeotropically by the addition of known azeotroping agents such as methyl-isobutyl ketone. A fourth embodiment is to precipitate the catalyst by such means as the addition of a hydroxide and to recycle the solid catalyst; this is advantageous when water is employed for catalyst extraction.

To illustrate the process of this invention as related to the recovery of oxidation catalysts from a distillation bottoms (the bottoms obtained by distilling a filtered reaction mixture derived from the oxidation of a commercial mixture of isomeric xylenes), the following examples are presented.

*Example 1*

The reaction mixture resulting from the air oxidation of mixed petroleum xylenes (containing 23.6 wt. percent ortho, 45.4% meta, 18.0% paraxylene, and 13.0% ethylbenzene and toluene) in acetic acid and in the presence of a bromine-promoted manganese and cobalt acetate catalyst is withdrawn from a reaction vessel. Additional quantities of glacial acetic acid are employed to rinse the vessel and are thereafter added to the reaction mixture. The reaction mixture is then cooled to approximately 20° C., filtered, and the filtrate washed with hot acetic acid. The cake is air dried and 7760 parts of dry filter cake are recovered. The dry cake is composed of 14.8 wt. percent orthophthalic acid, 55.2% isophthalic acid, and 30.0% terephthalic acid. The mother liquor and filter cake wash are combined and weigh approximately 27,500 parts. This is distilled batchwise at atmospheric pressure to remove the acetic acid and water of oxidation, leaving 2891 parts by weight of a solid residue containing aromatic acids, catalyst, bromine compounds, and coke or tar-like oxidation by-products. The aromatic acid portion of the residue is composed of 34.6 wt. percent benzoic acid, 2.4% toluic acids, 52.5% ortho-phthalic acid, 8.0% isophthalic acid and 2.5% terephthalic acid.

The residue from the above atmospheric distillation is re-distilled at 40 millimeters mercury absolute pressure in a batch operation to give a vacuum distillation bottoms fraction weighing 915 parts. By this second distillation a substantial portion of the benzoic acid and orthophthalic acid (as phthalic anhydride) are removed overhead. The remaining bottoms fraction is composed primarily of coke, tar-like oxidation by-products, compounds of the metal oxidation catalysts and of bromine, phthalic anhydride, and iso- and terephthalic acids.

The 915 part vacuum distillation bottoms is divided into two portions weighing 457.5 parts each. The first portion is pulverized and added to 7600 parts of boiling water. The mixture is maintained at the boiling point for 12 minutes and then cooled to approximately 20° C. and retained at that temperature for 110 minutes with constant agitation.

The mixture is filtered at 20° C. to remove an insoluble filter cake fraction containing tar-like oxidation by-products which is washed with 2660 parts of water at 20° C. The filter cake weighs 160 parts and is dark gray in color. It constitutes 28.5% of the original 457.5 part vacuum distillation bottoms fraction and is predominantly tar-like oxidation by-products.

The filtrate and water wash are evaporated to dryness and yield 314 parts of a straw yellow water-soluble extract. This extract is composed of 91% orthophthalic acid, the balance being compounds of the metal oxidation catalyst and some tar-like oxidation by-products.

Spectrometric analyses of the insoluble filter cake and of the straw yellow extract show that 93% of the cobalt and 94% of the manganese originally in the vacuum distillation bottoms are now contained in the extract. Nickel, iron, and chromium which are present in the vacuum distillation bottoms presumably as a result of corrosion during the oxidation, and which are themselves oxidation catalysts, are extracted to the extent of 80%, 60%, and 100% respectively.

Thus, water extraction is effective in recovering more than 90% of the heavy metal oxidation catalysts from a distillation bottoms, and also extracts 72 mol percent of the orthophthalic anhydride present.

As the extract contains less than 6% by weight of oxidation by-products it is recycled to a subsequent catalytic oxidation step.

*Example II*

The second 457.5 part fraction of vacuum distillation bottoms is pulverized and added to 7400 parts of boiling glacial acetic acid. The mixture is maintained at the boiling point (approximately 118° C.) for 5 minutes. The dark colored mixture is then cooled to about 20° C. and, with constant stirring, maintained at that temperature for about 55 minutes and filtered. An additional 5180 parts of glacial acetic acid is employed to wash the filter cake and the wash combined with the filtrate. The filter cake consists primarily of oxidation by-products and weighs 56.8 parts, representing 12.4 weight percent of the original 457.5 part vacuum distillation bottoms fraction.

The combined filtrate and the acetic acid wash are evaporated to dryness and yield 417.5 parts of a gray colored extract. By spectrometric analysis it is found that acetic acid extraction is effective in recovering 97.4% of the manganese oxidation catalyst and 95% of the cobalt; also about 95% or more of the nickel, iron and chromium which are themselves oxidation catalysts. The balance of the 417.5 part extract is primarily orthophthalic acid with lesser amounts of other benzene carboxylic acids and some tar-like oxidation by-products.

Either the filtrate or the solid extract may be recycled to the oxidation step.

Among the other lower saturated monocarboxylic acids which alternatively may be employed as extraction solvents are the paraffinic acids such as formic, propionic, butyric, isobutyric, α-α-dimethyl butyric, valeric, isovaleric, caproic, isocaproic, α-ethyl valeric, and caprylic acids. Similarly, the naphthenic acids may be used; cyclopropanecarboxylic, cyclobutanecarboxylic, and cyclohexanecarboxylic.

It is thus seen that our process affords a simple and highly efficient method for recovering oxidation catalysts from distillation bottoms. While our examples are related to a process for the oxidation of mixed xylenes it will be understood that the process is equally applicable and effective with any of the aromatic carboxylic acids.

We claim:

1. A process for recovering and recycling heavy metal oxidation catalyst from a distillation bottoms containing said heavy metal oxidation catalyst and tar-like oxidation inhibiting by-products, the said distillation bottoms being derived by distillation from at least a portion of the reaction mixture from the catalytic liquid phase oxidation of an aliphatic substituted aromatic compound with molecular oxygen in the presence of said heavy metal oxidation catalyst and bromine, said process comprising the steps of: extracting the heavy metal oxidation catalyst from the distillation bottoms fraction at a temperature between about 50 and 150° C. with between about 3 to about 50 volumes per volume of distillation bottoms of a solvent selected from the group consisting of water, lower saturated monocarboxylic acids, and mixtures thereof; and recycling at least a portion of the oxidation catalyst thus extracted to the liquid phase oxidation.

2. Process of claim 1 in which the solvent is water.

3. Process of claim 2 in which the oxidation catalyst is first separated from the extract and is thereafter recycled to the liquid phase oxidation.

4. Process of claim 1 in which the solvent is a lower saturated monocarboxylic acid.

5. Process of claim 4 in which the solvent is acetic acid.

References Cited in the file of this patent

UNITED STATES PATENTS

| | | |
|---|---|---|
| 2,245,528 | Loder | June 10, 1941 |
| 2,746,990 | Fortuin et al. | May 22, 1956 |
| 2,785,199 | Himel | Mar. 12, 1957 |
| 2,788,367 | Bills et al. | Apr. 9, 1957 |